US006784784B1

(12) United States Patent
Zehrung

(10) Patent No.: US 6,784,784 B1
(45) Date of Patent: Aug. 31, 2004

(54) REQUEST TO EXIT SWITCH FOR DOOR ALARM SYSTEM

(76) Inventor: Raymond E. Zehrung, 131 Serena Way, Santa Clara, CA (US) 95051

( * ) Notice: Subject to any disclaimer, the term of this patent is extended or adjusted under 35 U.S.C. 154(b) by 480 days.

(21) Appl. No.: 09/887,934

(22) Filed: Jun. 22, 2001

(51) Int. Cl.[7] ........................ G05B 19/00; G08B 23/00; G08B 13/08; G08B 15/02

(52) U.S. Cl. ........................ 340/5.3; 340/5.64; 340/500; 340/545.7; 340/825.31; 116/97; 116/17

(58) Field of Search ............................ 340/545.7, 5.64, 340/500, 5.3, 825.31; 116/97, 17; 362/501

(56) References Cited

U.S. PATENT DOCUMENTS 2,301,720 A * 11/1942 Tyminski ................. 340/393.3
3,866,164 A * 2/1975 Peterson ..................... 340/522
4,196,422 A * 4/1980 Swigert et al. ............. 340/542
4,624,120 A 11/1986 Hoffman et al. .............. 70/380
4,644,484 A * 2/1987 Flynn et al. ............... 340/5.23
5,057,830 A * 10/1991 Eisermann .................. 340/5.3
6,147,622 A 11/2000 Fonea ................... 340/825.31

OTHER PUBLICATIONS

Cal–Royal Gensis Series assembly drawing, 4 pages, published by Cal–Royal Products, Inc., City of Commerce, California.

Schlage D Service Manual, p. 6, published 1992 by Schlage Lock Company of San Francisco, California, a subsidiary of Ingersoll–Rand.

* cited by examiner

*Primary Examiner*—Michael Horabik
*Assistant Examiner*—Kimberly Hamilton
(74) *Attorney, Agent, or Firm*—David R. Glidea

(57) ABSTRACT

A door alarm system and a door lock assembly having an interior rose having a request to exit (REX) switch. The alarm system generates an open door alarm when a door into a secured area is open unless the REX switch generates a REX signal indicating that the door was opened by someone on the inside of the secured area. Mechanical isolation in the door lock assembly prevents a forcing movement on the outside of the door from causing a false generation of the REX signal.

25 Claims, 5 Drawing Sheets

REQUEST TO EXIT SWITCH FOR DOOR ALARM SYSTEM

BACKGROUND OF THE INVENTION

1. Field of the Invention

The invention relates generally to door alarm systems and more particularly to a door alarm system including a door lock assembly having an interior trim piece having a request to exit (REX) switch for generating a REX signal in response to a rotation on an interior handle where the REX switch is mechanically isolated from a forcing movement on the exterior side of the door lock assembly.

2. Description of the Prior Art

Door alarm systems are used for generating an alarm signal when a door into a secure area is forced open from outside the secured area. The alarm system typically includes alarm shunts so that a false alarm signal is not generated when the door is open for an authorized entry into the secured area or when a request to exit (REX) switch generates a REX signal as a result of the door being opened from the inside.

Existing door lock assemblies of a cylindrical type incorporate the REX switch in a latch retractor within a central chassis body of the assembly. However, such cylindrical door lock assemblies are known for generating false REX signals in response to a forced movement of the exterior side of the door lock assembly when a door is forced open. This false REX signal prevents the proper alarm signal from being issued for a forced entry into the secured area. An attempt has been made to solve this problem by using an infrared generator with an detector as the REX switch. The infrared detector detects either a broken beam or beam reflection from the generator or Doppler shift due to motion of an object reflecting the beam. However, this solution has the undesirable side effect that someone inside the secured area near to the door may unintentionally cause the infrared detector to generate a false REX signal, thereby enabling someone outside the secured area to force the door without causing the alarm signal to be given.

There is a need for a door alarm system and a door lock assembly that generates a request to exit (REX) signal in response to a rotation of an interior door handle where the movement of the door lock assembly due to a force applied on the exterior side does not result in a false generation of the REX signal.

SUMMARY OF THE INVENTION

It is therefore an object of the present invention to provide a door alarm system where an interior trim piece of a door lock assembly includes a request to exit (REX) switch that is mechanically isolated from the exterior side of the door lock assembly so that a forcing movement applied to the exterior side of the door lock assembly is prevented from causing a false generation of the REX signal.

Briefly, in a preferred embodiment, an alarm system of the present invention includes a door detector, an entry request device, a door lock assembly, and a control unit. The door detector provides an open door signal when a door is open. The entry request device provides a request to enter (REN) signal having an authorization code in response to a request by a user on the exterior of an area secured by the door to enter the secured area. The control unit checks the validity of the authorization code. When the code is valid, the control unit issues a lock control signal to the door lock assembly for unlocking the door. The door lock assembly includes an interior trim piece having a request to exit (REX) switch. The REX switch automatically provides a request to exit (REX) signal when a user within the secured area uses the door lock assembly to exit the secured area. The control unit issues an alarm signal when it receives the open door signal unless it also receives either the REN signal having a valid authorization code or the REX signal.

A cylindrical door lock assembly of a preferred embodiment includes an exterior trim piece, a door lock chassis, a latch, and the interior trim piece. The chassis includes a central fixed chassis body for receiving the lock control signal, an interior spindle, and an exterior spindle. The interior and exterior spindles rotate independently within the chassis body for operating a latch retractor for retracting the latch.

When the lock control signal is in the unlocked state, a rotation of the exterior spindle by an exterior handle operates latch retractor for retracting the latch. When the lock control signal is in the locked state, the exterior spindle is prevented from rotating and the latch cannot be retracted. On the other hand, a rotation by an interior handle rotates the interior spindle operates the latch retractor causing the latch to retract regardless of the state of the lock control signal and also causes the REX switch to generate the REX signal.

The interior trim piece in a preferred embodiment is known as a rose or spring package. The rose (or spring package) includes a housing having an inner aperture, an interface linkage including a switch actuator plate, a spring, and the REX switch. The housing is fixed to the door and the REX switch is fixed to the housing. The interior spindle passes through the inner aperture for connection to the interior handle. The switch actuator plate revolves about a center axis of the interior spindle in response to the rotation of the interior handle. The spring urges against the rotation of the handle and returns the handle to its normal angle when no external torque is applied. The REX signal is generated when a tab or notch on the switch actuator revolves past the REX switch.

An advantage of the present invention is that the REX switch is mechanically isolated so that a force on an exterior side door handle causing movement of the exterior spindle of a door lock assembly does not cause a false generation of a request to exit (REX) signal that would shunt an alarm signal when a door is forced open from the exterior side.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
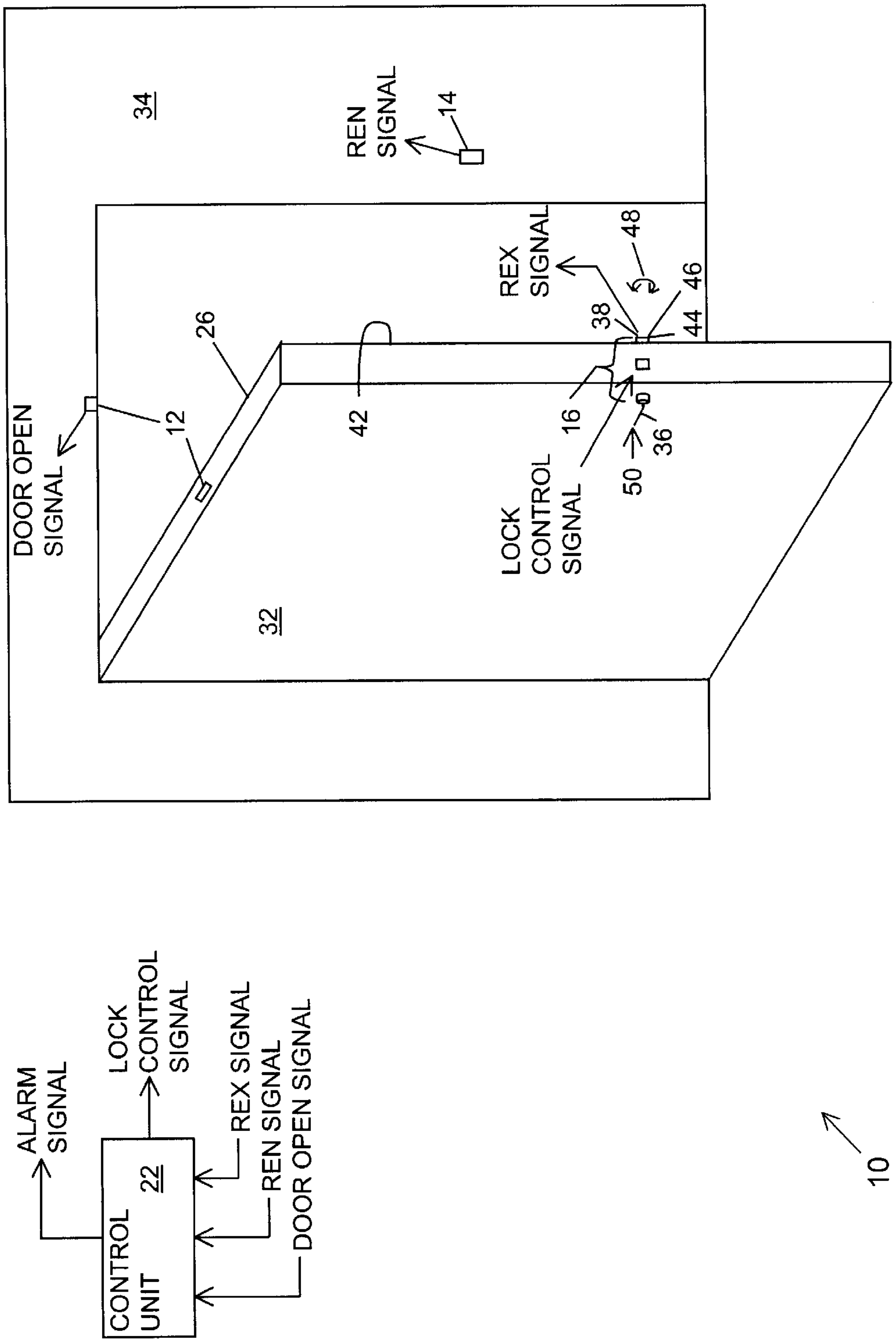
FIGS. 1 is a block diagram of an alarm system of the present invention.

FIG. 1 is a block diagram of a door alarm system of the present invention referred to by a general reference number 10. The system 10 includes a door detector 12, an entry request device 14, a door lock assembly 16, and a control unit 22. The door detector 12 generates an open door signal when a door 26 is open. The open door signal is transmitted in either a wired or a wireless form to the control unit 22. In a preferred embodiment, the door detector 12 is a reed switch and a magnet. The reed switch is mounted into a door jamb for the door 26. The magnet is mounted into an edge of the door 26. The reed switch can be either normally open or normally closed. When the door 26 is open the reed switch has its normal state indicative that the door 26 is open. When the door 26 is closed the magnet induces the reed switch to take its actuated state indicative that the door 26 is closed. The open door signal uses power in the control unit 22 or in a power supply that is local to the door detector 12 for indicating the normal or actuated state of the reed switch and thereby indicating that the door is open or closed.

Other alternative embodiments of the door detector 12 will certainly be apparent to those of ordinary skill in the art. In one such alternative embodiment, the door detector 12 uses a ledge on the edge of the door 26 for actuating a mechanical switch in the door jamb. In another alternative embodiment, the door detector 12 uses an infrared signal generator and detector mounted in the door jamb and an infrared reflector mounted in edge of the door 26. In another alternative embodiment, the door detector 26 uses a microwave signal generator and detector mounted in the door jamb and microwave harmonic generator mounted in the edge of the door 26. The microwave generator generates a microwave signal, the harmonic generator generates harmonics of the microwave signal, and the detector detects the harmonics at close range.

The entry request device 14 mounts so that it is accessible from an exterior side 32 of the door 26 for enabling a user to request that the door 26 be unlocked so that he can open the door 26 to enter a secured area. The device 14 responds to the user request by issuing a request to enter (REN) signal in either a wired or a wireless form to the control unit 22. In a preferred embodiment the device 14 is a card reader. The user inserts a card having a magnetic authorization code into the card reader.

The REN signal includes the authorization code for verification by the control unit 22. When the control unit 22 receives the REN signal from the entry request device 14, it tests the authorization code for validity. When the authorization code is valid, the control unit 22 issues a lock control signal to the door lock assembly 16 to unlock the door 26. Other alternative embodiments of the entry request device 14 will certainly be apparent to those of ordinary skill in the art. In one alternative embodiment the device 14 includes a mechanical key mechanism and a signal generator for issuing the REN signal in response to the insertion or rotation of a mechanical key. The mechanical key mechanism can be mounted on a wall 34 adjacent to the exterior side 32 of the door 26 or contained within the door lock assembly 16 accessible on the exterior side 32. In another alternative embodiment the device 14 is a code pad mounted on the wall 34 adjacent to the exterior side 32. In another alternative embodiment the device 14 is a reader of personal characteristics such as finger prints, eyes, voice, or the like mounted on the exterior side 32 of the door 26 or the wall 34 adjacent to the exterior side 32.

The door 26 is locked and unlocked by the door lock assembly 16 in response to the lock control signal that is received in a wired or wireless form from the control unit 22. The door lock assembly 16 and the lock control signal can be implemented as fail secure where the door 26 is normally locked and the lock control signal supplies power to unlock the door 26 or as fail safe where the door 26 is normally unlocked and the lock control signal supplies power to lock the door 26.

The door lock assembly 16 includes an exterior handle 36 on the exterior side 32 of the door 26 and an interior handle 38 on an interior side 42 of the door 26. When the door lock assembly 16 unlocks the door 26, a user can use the exterior handle 36 to unlatch and open the door 26 and enter the area secured by the door 26. Such door lock assembly 16 is illustrated in FIG. 2 and described in the accompanying detailed description.

The door lock assembly 16 also includes an interior trim piece 44 for mounting on the interior side 42 of the door 26. The interior trim piece 44 is made up of an assembly of elements including a REX switch 46. A rotation 48 of the interior handle 38 causes two things to happen. The door lock assembly 16 unlatches the door 26 and enables the user to open the door 26 and exit from the area secured by the door 26. And, the REX switch 46 issues a request to exit (REX) signal in either a wired of wireless form to the control unit 22. The rotation 48 can be configured as clockwise or counterclockwise.

An alarm signal is generated by the control unit 22 when the open door signal from the door detector 12 indicates that the door 26 is open unless the alarm is shunted by the REN signal with a valid authorization code for unlocking the door 26 for entering the secured area, or the REX signal for exiting the secured area. The REX switch 46 is mechanically isolated within the door lock assembly 16 so that movement caused by an external force 50, such as a hard push or torque on the exterior handle 36, applied to the door lock assembly 16 from the exterior side 32 for forcing the door 26 to open does not cause a false REX signal that would enable an unauthorized user on the exterior side 32 to fool the system 10 into believing that a valid user was exiting. The power for the door open signal, the REN signal, and the REX signal can be supplied locally or from the control unit 22.

Figure 2:
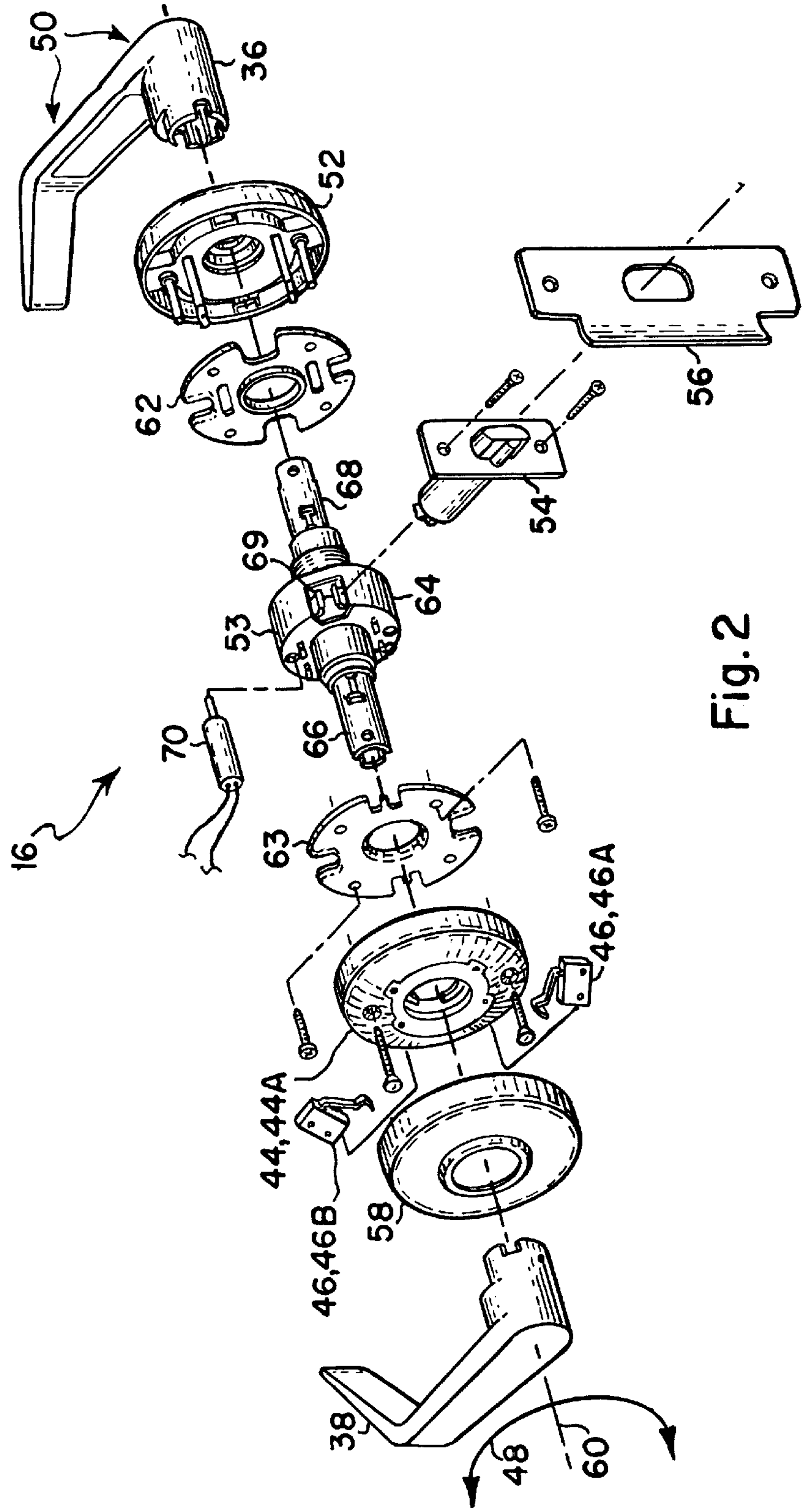
FIG. 2 is an assembly drawing of a door lock assembly of the alarm system of FIG. 1.

FIG. 2 is an illustration of a preferred embodiment of the door assembly 16 in a disassembled state showing the exterior handle 36, the interior handle 38, the interior trim piece 44, the REX switch 46, an exterior trim piece 52, a chassis 53, a latch 54, a strike 56, and a trim cover 58. In a preferred embodiment the interior trim piece 44 is a rose 44A. The rose 44A is sometimes known as a spring package. The exterior handle 36, the interior handle 38, the rose 44A, the exterior trim piece 52, the chassis 53, and the trim cover 58 share a common center axis 60. The strike 56 is securely mounted into a door jamb in the wall 34. The rose (or spring package) 44A and the exterior trim piece 52 are fixed to each other with bolts or the like that pass through the door 26 (FIG. 1). An optional exterior plate 62 and/or an optional interior plate 63 can be included for additional mechanical support for mounting the door lock assembly 16 to the door 26 (FIG. 1). The rose 44A is covered by the trim cover 58.

The chassis 53 includes a fixed central cylindrical chassis body 64, a rotational interior spindle 66, and a rotational exterior spindle 68. The interior spindle 66 extends from the chassis body 64 through the interior side 42 (FIG. 1) of the door 26 (FIG. 1) into the rose 44A. The exterior spindle 68 extends in the opposite direction from the chassis body 64 through the exterior side 32 (FIG. 1) of the door 26 (FIG. 1) and into the exterior trim piece 52. The chassis body 64 includes a latch retractor 69 and an electromechanical device 70 such as a solenoid or a motor.

The exterior handle 36 mounts on the exterior spindle 68 from outboard of the exterior trim piece 52. When the door lock chassis 53 is unlocked, a rotation of the exterior handle 36 about the center axis 60 rotates the exterior spindle 68 with respect to the chassis body 64. The interior handle 38 mounts on the interior spindle 66 from outboard of the rose 44A. The rotation 48 of the interior handle 38 about the center axis 60 operates through the fixed rose 44A to rotate the interior spindle 68 with respect to the chassis body 64.

The latch retractor 69 is engaged independently to the interior spindle 66 and the exterior spindle 68 for retracting the latch 54 from the strike 56 in response to the rotation 48 of the interior spindle 66 or a rotation of the exterior spindle 68. The electromechanical device 70 includes linkages for locking the exterior spindle 68 in accordance with the lock control signal from the control unit 22 (FIG. 1). When the exterior spindle 68 is locked, it is prevented from rotating unless the external force 50 is very large.

The rotation of the exterior handle 36 couples into a spring within the exterior trim piece 52 for urging against the rotation and returning the exterior handle 36 to an unrotated angle when the exterior handle 36 is released. Similarly, the rotation 48 of the interior spindle 66 couples into a spring (74 in FIG. 3 and 74A–B in FIG. 5) within the rose 44A for urging against the rotation and returning the interior handle 38 to an unrotated angle when the interior handle 38 is released. The rotation 48 of the interior handle 38 also causes the REX switch 46 within the rose 44A to issue the REX signal to the control unit 22 (FIG. 1).

Because the interior spindle 66 and the exterior spindle 68 operate independently within the chassis body 53, the rose 44A is mechanically isolated from the exterior spindle 68. The REX switch 46 is further mechanically isolated by looseness and lost motion between the interior spindle 66 and the interior handle 38, between the interior handle 38 and the rose 44A, and within the rose 44A as described below. The force 50 on the exterior handle 38 for forcing the door 26 to open may cause a few degrees of rotational movement or a few millimeters of in-and-out movement of the exterior spindle 68. However, this forced movement is attenuated or eliminated by the mechanical isolation, spaces within connections, and lost motion between the exterior spindle 68 and the REX switch 46 within the rose 44A so that there is little or no movement within the rose 44A for causing the REX switch 46 to generate a false REX signal that would shunt the proper alarm signal in the system 10 (FIG. 1). In a preferred embodiment, the REX switch 46 includes a first REX switch element 46A for detecting the rotation 48 in one direction about the center axis 60 and a second REX switch element 46B for detecting the rotation 48 in the other direction about the center axis 60.

Figure 3:
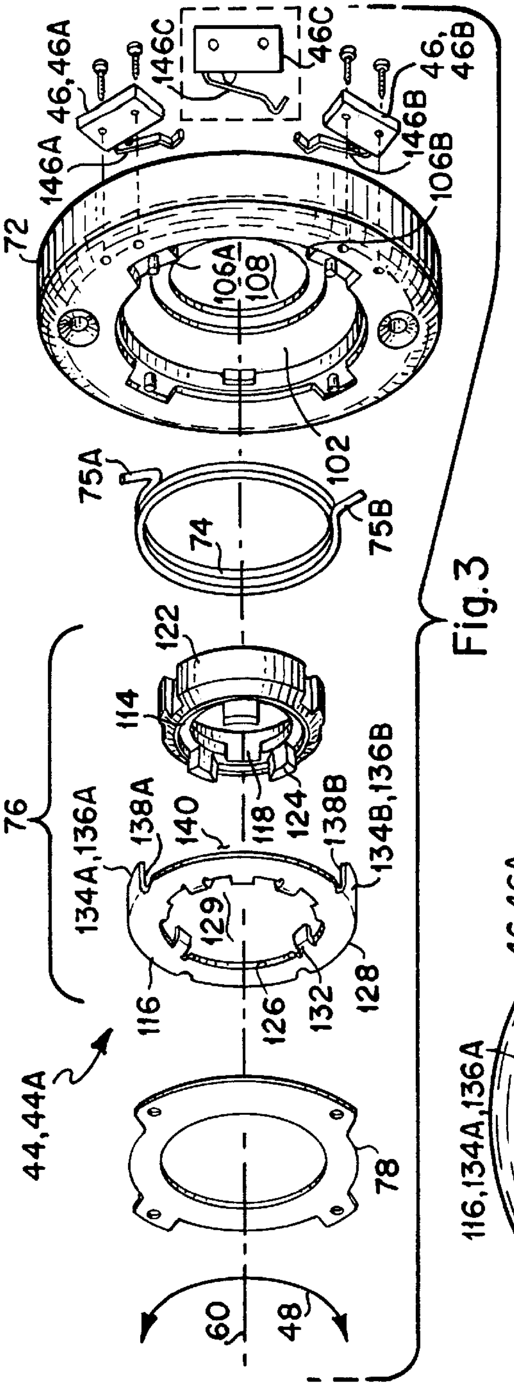
FIG. 3 is an assembly drawing of a door trim piece rose of the door lock assembly of FIG. 2.

FIG. 3 is an assembly illustration of the rose 44A of the present invention. The rose 44A includes a housing 72, a coil spring 74 including bent ends 75A and 75B, an interface linkage 76, a cover plate 78, and the REX switch 46. The housing 72, the spring 74, the interface linkage 76, and the cover plate 78 share the center axis 60. The cover plate 78 fastens into the top of the housing 72 for retaining the interface linkage 76 within the top cavity 102. The REX switch 46 includes the first REX switch element 46A for detecting the rotation 48 that is counterclockwise about the center axis 60 and the second REX switch element 46B for detecting the rotation 48 that is clockwise about the center axis 60.

The housing 72 includes a top cavity 102, shoulders 106A and 106B, and an inner aperture 108. The inner aperture 108 connects the bottom of the housing 72 to the top cavity 102 and is concentric with the center axis 60 for accepting the interior spindle 66. The spring 74 is coiled within the top cavity 102 beneath the interface linkage 76 and outside the circumference of the inner aperture 108. The bent ends 75A and 75B of the spring 74 seat on the shoulders 106A and 106B for retaining the spring 74 in a compressed condition. The shoulders 106A and 106B face into the top cavity 102 and are longitudinally parallel to the center axis 60.

The interface linkage 76 preferably includes a socket 114 and an annular switch actuator plate 116. The socket 114 includes an inner passage 118 and a slotted outer surface 122, both concentric with the center axis 60, and top fingers 124 extending parallel to the center axis 60. The top fingers 124 seat in the interior handle 38 (FIGS. 1, 2) so that the rotation 48 of the interior handle 38 (FIGS. 1, 2) causes the rotation 48 of the socket 114 about the center axis 60. The interior spindle 66 (FIG. 2) passes through the inner aperture 108 of the housing 72 and the inner passage 118 of the socket 114 for connection to the interior handle 38 so that the rotation 48 of the interior handle causes the rotation 48 of the interior spindle 66 (FIG. 2).

The annular actuator plate 116 includes an inner edge 126 and an outer edge 128. The inner edge 126 forms the outside of an inner aperture 129 concentric with the center axis 6.0. The inner edge 126 includes fingers 132 that engage to the slotted outer surface 122 of the socket 114 so that the rotation 48 of the socket 114 also causes the rotation 48 of the actuator plate 116 about the center axis 60 while allowing the socket 114 and the actuator plate 116 freedom to slide parallel to the center axis 60.

The outer edge 128 of the actuator plate 116 has at least one downward fold forming a tab acting as a switch actuator and preferably first and second folds forming first and second tabs 134A and 134B acting as first and second actuator elements 136A and 136B. Edges of the first and second tabs 134A and 134B have first and second steps 138A and 138B, respectively. The first and second steps 138A and 138B lead in first and second directions of the rotation 48, respectively. A notch 140 is formed between the first and second steps 138A and 138B. When no rotation 48 is applied, the first step 138A is juxtaposed to the first shoulder 106A and the second step 138B is juxtaposed to the second shoulder 106B. The rotation 48 the first direction causes the first step 138A to push on the bent end 75A causing further compression of the spring 75. Similarly, the rotation 48 in the second direction causes the second step 138B to push on the other bent end 75B causing further compression of the spring 74, thereby causing the spring 74 to urge against the rotation 48 in either direction.

The switch actuator elements 136A and 136B actuate the first and second REX switch elements 46A and 46B to indicate the rotation 48 in either direction. Preferably, the first and second REX switch elements 46A and 46B are examples of a small mechanical switch commonly known as microswitch that is actuated by pushing down on a spring-loaded button or lever arm 146 that is pivoted to push down on the spring-loaded button. When no rotation 48 is applied, the first tab 134A (actuator 136A) pushes a lever arm 146A on the first microswitch (REX switch element 46A) and the second tab 134B (actuator 136B) pushes a lever arm 146B on the second microswitch (REX switch element 46B) so that both of the microswitches (REX switch elements 46A and 46B) indicate that no rotation 48 is being applied.

When the rotation 48 is applied in the first direction, the second step 138B (of the second actuator 136B) backs past a position where it is juxtaposed to the lever arm 146B on the second microswitch (REX switch element 46B) thereby releasing the lever arm 146B causing the second microswitch (REX switch element 46B) to indicate the rotation 48 in the first direction while the state of the first microswitch (REX switch element 46A) remains unchanged. When the rotation 48 is applied in the second direction, the first step 138A (of the first actuator 136A) backs past a position where it is juxtaposed to the lever arm 146A on the first microswitch (REX switch element 46A) thereby releasing the lever arm 146A causing the first microswitch (REX switch element 46A) to indicate the rotation 48 in the second direction while the state of the second microswitch (REX switch element 46B) remains unchanged.

In an alternative embodiment the REX switch elements 46A and 46B are replaced by a REX switch 46C. The REX switch 46C is positioned within the housing 72 so that a lever arm 146C is opposite the notch 140. When the lever arm 146C is relaxed into the notch 140 the microswitch (REX switch 46C) indicates that no rotation 48 is being applied. When the rotation 48 is applied in the first direction, the first step 138A (to the first actuator 136A) passes a position where it is juxtaposed to the lever arm 146C thereby pushing down on the lever arm 146C causing the microswitch (REX switch 46C) to indicate the rotation 48 in the first direction. When the rotation 48 is applied in the second direction, the second step 138B (to the second actuator 136B) passes a position where it is juxtaposed to the lever arm 146C on the microswitch (REX switch 46C) thereby pushing down on the lever arm 146C causing the microswitch (REX switch 46C) to indicate the rotation 48 in the second direction.

Figure 4B:
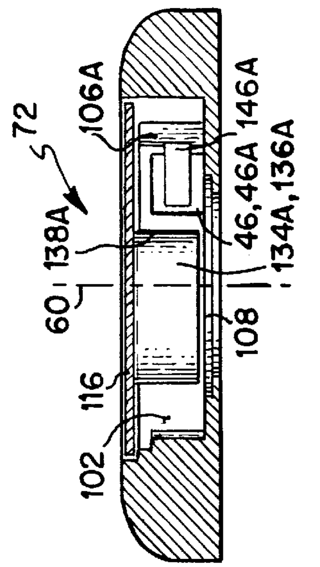
FIGS. 4A and 4B are a top view and a cross-sectional side view, respectively, of a housing of the door trim assembly of FIG. 3.
Figure 4A:
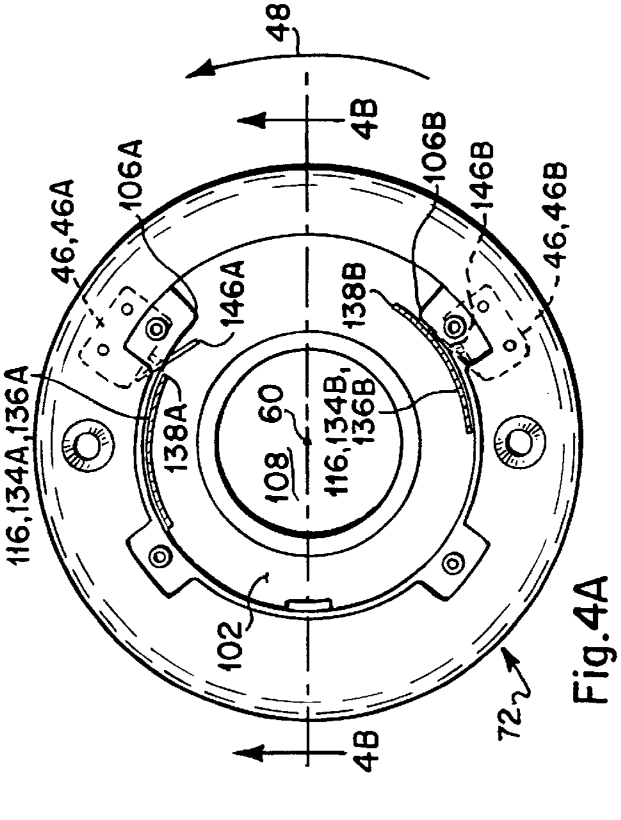

FIGS. 4A and 4B are a top view and a cross-sectional side view, respectively, of the housing of the present invention referred to by the reference number 72. The housing 72 includes the top cavity 102, the first and second shoulders 106A and 106B, and the inner aperture 108 described in the detailed descriptions accompanying FIG. 3. The first and second REX switch elements 46A and 46B are mounted into the housing 72 so that the first and second lever arms 146A and 146B, respectively, are pushed and released by the first and second tabs 134A and 134B, respectively, acting as first and second actuators 136A and 136B, respectively, as described above. The first and second tabs 134A and 134B are shown in a position for the rotation 48 (FIGS. 2 and 3) in a counterclockwise direction so that the first REX switch element 46A generates the REX signal.

The mounting location of the first and second REX switch elements 46A and 46B with respect to the first and second steps 138A (for actuator 136A) and 138B (for actuator 136B), respectively, can be selected for the number of degrees of the rotation 48 about the center axis 60 that are required before the REX signal is generated. The locations can be selected so that less then one degree of the rotation 48 will trigger the REX signal. However, to guard against false REX signals, the locations are preferably selected so that between 3 and 8 degrees of the rotation 48 is required to trigger the REX signal.

The door lock assembly 16 illustrated in FIGS. 2, 3 and-4A–B and described in the accompanying detailed descriptions can be constructed from a Genesys series door lock assembly available from Cal-Royal Products, Inc. of City of Commerce, California. The housing 72 is machined from a standard housing in the Genesys for accommodating the first and second REX switch elements 46A and 46B or the REX switch 46C, and then the first and second REX switch elements 46A and 46B or the REX switch 46C are installed into the housing 72 with screws, bolts, glue, or the like.

Figure 5:
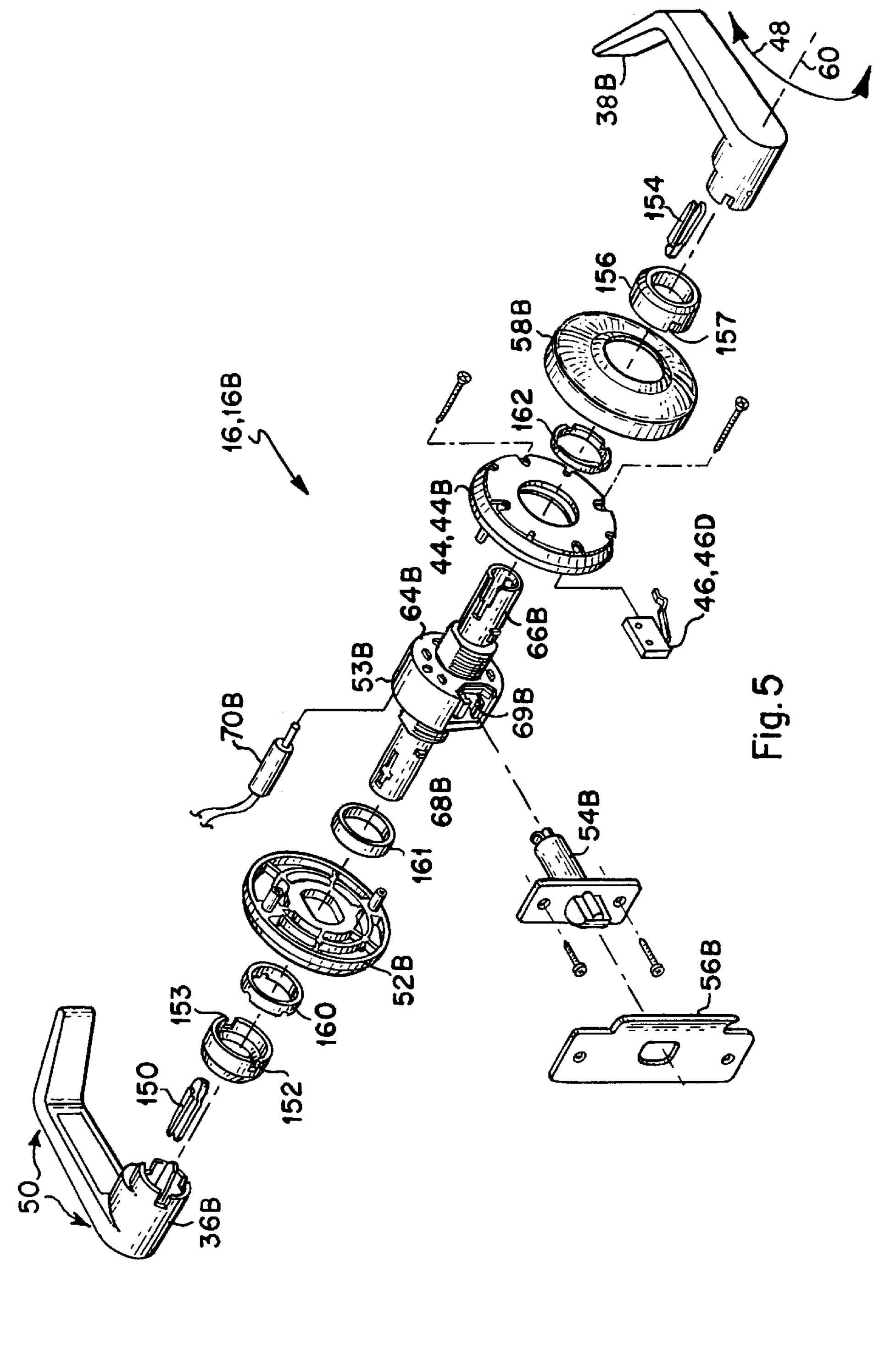
FIG. 5 is an assembly drawing of another door lock assembly of the alarm system of FIG. 1.

FIG. 5 is an assembly illustration of another preferred embodiment of a door lock assembly of the present invention referred to with a reference number 16B. The door lock assembly 16B operates as illustrated in FIG. 1 and described in the accompanying detailed description for the door lock assembly 16 in the system 10 (FIG. 1).

The door lock assembly 16B includes an exterior handle 36B, an exterior trim piece 52B, a chassis 53B, a latch 54B, a strike 56B, an interior trim cover 58B and an interior handle 38B operating in a similar manner to the exterior handle 36, the exterior trim piece 52, the chassis 53, the latch 54, the strike 56, the interior trim cover 58 and the interior handle 38, respectively, illustrated in FIG. 2 and described in the accompanying detailed description. The door lock assembly 16B also includes the interior trim piece 44. In a preferred embodiment the interior trim piece 44 is a rose 44B. The rose 44B is also known as a spring package. The rose (or spring package) 44B includes the REX switch 46 having a preferred embodiment 46D operating in a similar manner to the REX switch 46 described above.

The chassis 53B includes a chassis body.64B, an interior spindle 66B, an exterior spindle 68B, a latch retractor 69B, and an electromechanical device 70B operating in a similar manner to the chassis body 64, the interior spindle 66, the exterior spindle 68, the latch retractor 69 and the electromechanical device 70, respectively, illustrated in FIG. 2 and described in the accompanying detailed description. An exterior handle key 150 engages the exterior handle 36B to an exterior trim driver 152. The exterior trim driver 152 includes slots 153 for engaging the exterior trim piece 52B. Similarly, an interior handle key 154 engages the interior handle 38B to an interior trim driver 156. The interior trim driver 156 includes slots 157 for engaging the rose 44B. The rotation 48 of the interior handle 38B about the center axis 60 rotates the interior spindle 66B with respect to the chassis body 64B. The rotation 48 of the interior spindle 66B causes the latch retractor 69B to retract the latch 54B from the strike 56B to enable the door 26 to be opened.

The exterior spindle 68B is locked or unlocked by the electromechanical device 70B in response to the lock control signal from the control unit 22 (FIG. 1). When the exterior spindle 68B is unlocked, a rotation of the exterior handle 36B about the center axis 60 rotates the exterior spindle 68B with respect to the chassis body 64B. The rotation of the exterior spindle 68B causes the latch retractor 69B to retract the latch 54B from the strike 56B to enable the door 26 to be opened. The rotation of the exterior handle 36 also couples through the key 150 and the driver 152 into a spring within the exterior trim piece 52 for urging against the rotation and returning the exterior handle 36B to an unrotated angle when the exterior handle 36B is released. When the exterior spindle 68B is locked, the exterior handle 36B is prevented from rotating unless the force 50 is very large. An exterior trim nut 160, an exterior trim sleeve 161, and an interior trim nut 162 provide support for fixing the chassis 53B to the door 26 (FIG. 1).

The REX switch 46D is mechanically isolated by looseness and lost motion between the exterior spindle 68B and the interior spindle 66B, between the interior spindle 66B and the rose 44B, and within the rose 44B as described below. The force 50 on the exterior handle 38B for forcing the door 26 to open may cause a few degrees of rotational movement or a few millimeters of in-and-out movement of the exterior spindle 68B. However, this forced movement is attenuated or eliminated by the mechanical isolation, space within the connections, and lost motion between the exterior spindle 68B and the REX switch 46D so that there is little or no movement within the rose 44B for causing the REX switch 46D to generate a false REX signal that would shunt the proper alarm signal in the system 10 (FIG. 1).

Figure 6:
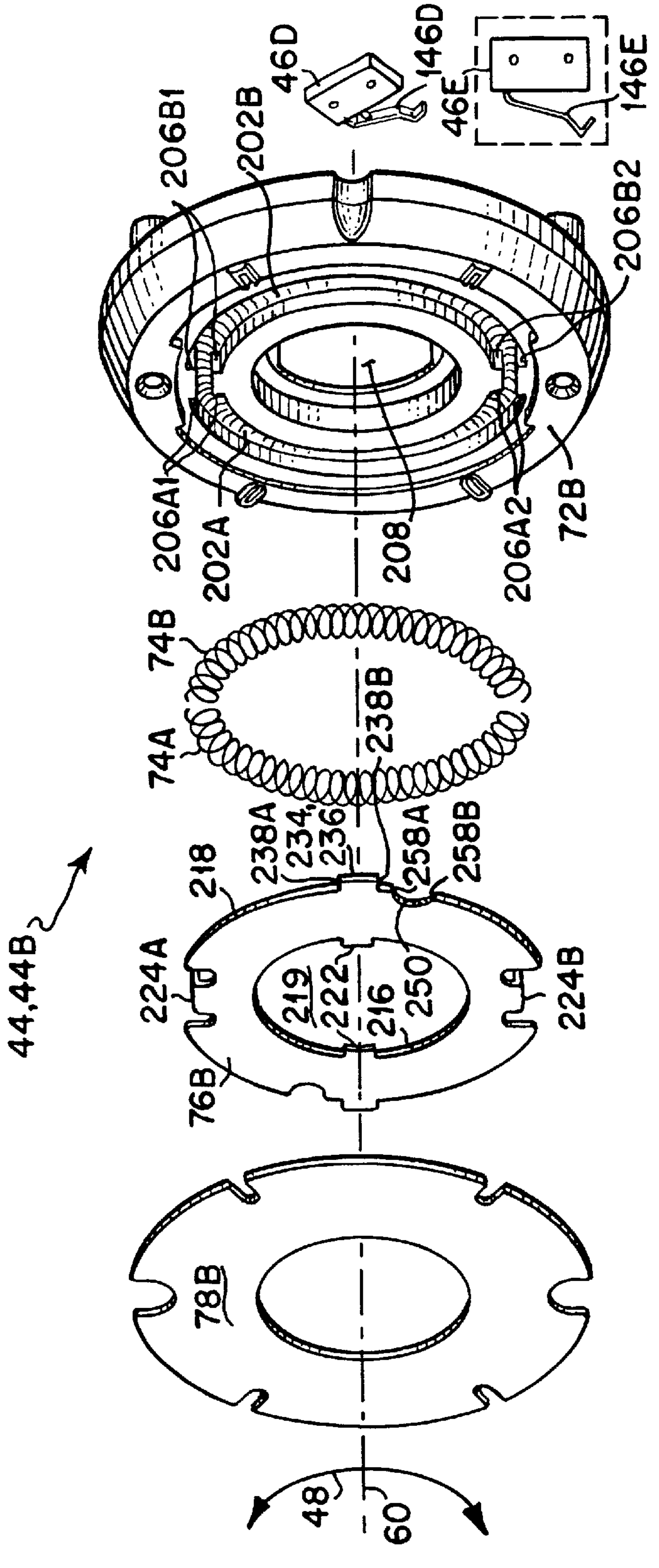
FIG. 6 is an assembly drawing of a door trim piece rose of the door lock assembly of FIG. 5.

FIG. 6 is an assembly illustration of the rose 44B of the present invention. The rose 44B includes a housing 72B, first and second coil springs 74A and 74B, an interface linkage 76B and a cover plate 78B operating in a similar manner to the housing 72, the spring 74, the interface linkage 76 and the cover plate 78, respectively, described in the detailed description accompanying FIG. 3. The housing 72B includes a first semi-circular cavity 202A bounded by shoulder pairs 206A1 and 206A2, a second semi-circular cavity 202B bounded by shoulder pairs 206B1 and 206B2, and an inner aperture 208. The semi-circular cavities 202A and 202B are concentric with the center axis 60 and the shoulder pairs 206A1, 206A2, 206B1, and 206B2 are longitudinally parallel to the center axis 60.

The interface linkage 76B is a switch actuator plate including an inner edge 216 and an outer edge 218. The inner edge 216 forms the outside of an inner aperture 219 concentric with the center axis 60. The inner edge 216 includes fingers 222 that engage to the slots 157 (FIG. 5) of the interior trim driver 156 (FIG. 5) so that the rotation 48 of the interior trim driver 156 (FIG. 5) by the interior handle 38B (FIG. 5) causes the rotation 48 of the interface linkage 76B about the center axis 60 while allowing the interior trim driver 156 (FIG. 5) and the interface linkage 76B freedom to slide parallel to the center axis 60.

The interior spindle 66B (FIG. 5) passes through the inner aperture 208 of the housing 72B and the inner aperture 219 of the interface linkage 76B for connection to the interior handle 38B so that the rotation 48 of the interior handle 38B (FIGS. 1, 5) causes the rotation 48 of the interior spindle 66B (FIG. 5).

The cover plate 78B fastens into the top of the housing 72B for retaining the interface linkage 76B against the top of the housing 72B. The interface linkage 76B covers the semi-circular cavities 202A and 202B. The first coil spring 74A rests in the semi-circular cavity 202A retained by the shoulder pairs 206A1 and 206A2 in a compressed condition. Similarly, the second coil spring 74B rests in the semi-circular cavity 202B retained by the shoulder pairs 206B1 and 206B2 in a compressed condition.

The interface linkage 76B is a plate-like structure having a similar function to the switch actuator plate 116 in the rose 44A. The outer edge 218 of the interface linkage 76B has downward folded tabs 224A and 224B. When no rotation 48 is applied, the edges of the tab 224A are juxtaposed to the shoulder pairs 206A1 and 206B1, respectively, and the edges of the tab 224B are juxtaposed to the shoulder pairs 206A2 and 206B2. The rotation 48 in either direction causes the tabs 224A and 224B to further compress the coil springs 74A and 74B to urge against the rotation 48.

The outer edge 218 of the interface linkage 76B also includes another tab 234 acting as a switch actuator 236. The tab 234 has first and second steps 238A and 238B at the edges of the tab 234 for operating the REX switch 46D to indicate the rotation 48 in either direction. Preferably, the REX switch 46D is a mechanical switch of a type commonly known as a microswitch. The microswitch (REX switch 46D) is actuated by pushing down on a spring-loaded lever arm 146D. When no rotation 48 is applied, the tab 234 (actuator 236) pushes a lever arm 146D on the microswitch (REX switch 46D) to indicate that no rotation 48 is being applied.

When the rotation 48 is applied in a first direction, the step 238A (of the actuator 236) backs past a position where it is juxtaposed to the lever arm 146D on the microswitch (REX switch 46D) thereby releasing the lever arm 146D causing the microswitch (REX switch 46D) to indicate the rotation 48 in the first direction. When the rotation 48 is applied in the second direction, the second step 238B (of the actuator 236) backs past a position where it is juxtaposed to the lever arm 146D on the microswitch (REX switch 46D thereby releasing the lever arm 146D causing the microswitch (REX switch 46D) to indicate the rotation 48 in the second direction.

In an alternative embodiment the REX switch 46D is replaced by a REX switch 46E. The outer edge 218 of the interface linkage 76B includes a notch 250. The notch 250 has first and second steps 258A and 258B at the edges of the notch 250. The surface of the interface linkage 76B acts as the switch actuator 236. The REX switch 46E is positioned within the housing 72B so that the lever arm 146E is opposite the notch 250. When the lever arm 146E is relaxed into the notch 250 the microswitch (REX switch 46E) indicates that no rotation 48 is being applied. When the rotation 48 is applied in the first direction, the first step 258A (to the actuator 236) passes a position where it is juxtaposed to the lever arm 146E thereby pushing down on the lever arm 146E causing the microswitch (REX switch 46E) to indicate the rotation 48 in the first direction. When the rotation 48 is applied in the second direction, the second step 258B (to the actuator 236) passes a position where it is juxtaposed to the lever arm 146*e* on the microswitch (REX switch 46E) thereby pushing down on the lever arm 146E causing the microswitch (REX switch 46E) to indicate the rotation 48 in the second direction.

The door lock assembly 16B illustrated in FIGS. 5 and 6 and described in the accompanying detailed descriptions can be constructed from a D series door lock assembly available from Schlage Architectural Hardware a division of Ingersoll Rand Security Company of Security, Colorado. The housing 72B is machined from a standard housing in the D-series for accommodating the REX switch 46D or 46E, and then the REX switch 46D or 46E is installed into the housing 72B using screws, bolts, glue, or the like.

Those skilled in the art can undoubtedly accomplish the same thing as the present invention using other types of switch and actuator combinations to substitute for the REX switches 46A–E and the actuators of the preferred embodiments. Other embodiments might use reed switches with magnet actuators, infrared generators and detectors with reflection actuators, conductors with mercury actuators, microwave generators and detectors with devices as actuators that reflect harmonics, mechanical switches with fin and spring clip arrangements, and the like.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An alarm system, comprising:

a control unit for generating a lock control signal in response to a request to enter (REN) signal; and generating an alarm signal in response to an open door signal when both of said REN signal and a request to exit (REX) signal are absent;

a door detector for generating said open door signal indicative of an open door, said door having an exterior side and an interior side;

a device for generating said (REN) signal in response to a request to unlock said door from said exterior side;

a door lock assembly fixed to said door for unlocking said door in accordance with said lock control signal; the door lock assembly engaged to an interior handle on said interior side for unlatching said door in response to a rotation of said interior handle, the door lock assembly having mechanical isolation between said exterior side and said interior side; and a REX switch within the door lock assembly on said interior side for generating said REX signal in response to said rotation, wherein said mechanical isolation prevents force on said exterior side from generating said REX signal.

2. The system of claim 1, wherein:

said mechanical isolation prevents movement of the door lock assembly on said exterior side caused by an external force to the door lock assembly on said exterior side from causing a false generation of said REX signal.

3. The system of claim 1, wherein:

the REX switch includes a first REX switch element and a second REX switch element, said first REX switch element for generating said REX signal in response to said rotation in a first direction, and said second REX switch element for generating said REX signal in response to said rotation in a second direction.

4. The system of claim 1, wherein:

the door lock assembly includes an interior spindle extending toward said interior side and an interior trim piece fixed on said interior side, said interior spindle engaged to said interior handle for rotating within the door lock assembly for unlatching said door in response to said rotation, said interior trim piece including the REX switch for generating said REX signal.

5. The system of claim 4, wherein:

said interior trim piece includes a switch actuator plate coupled to said interior handle, said switch actuator plate having a step revolving about a center axis in response to said rotation; and said REX switch generates said REX signal when said step revolves past a position juxtaposed to said REX switch.

6. The system of claim 5, wherein:

said REX switch generates said REX signal when said rotation rotates an angle in a range of 3 degrees to 8 degrees.

7. The system of claim 5, wherein:

said switch actuator plate rotates in a plane perpendicular to said center axis in response to said rotation;

said step projects outside said plane; and said REX switch generates said REX signal when said step revolve past said position.

8. The system of claim 5, wherein:

said switch actuator plate includes a first said step at an edge of a first tab and a second said step at an edge of a second tab; and said REX switch includes a first REX switch element and a second REX switch element, said first REX switch element using said first step for generating said REX signal in response to said rotation in a first direction, and said second REX switch element using said second step for generating said REX signal in response to said rotation in a second direction.

9. A door lock assembly comprising:

an interior spindle for rotating within the door lock assembly for unlatching a door in response to a rotation of an interior handle; and an interior spring package including a request to exit (REX) switch for generating a REX signal in response to said rotation of said interior handle, the interior spindle passing loosely through an aperture in the spring package to said interior handle.

10. A door lock assembly comprising:

an interior spindle for rotating within the door lock assembly for unlatching a door in response to a rotation of an interior handle;

a trim piece including a request to exit (REX) switch for generating a REX signal in response to said rotation of said interior handle; and an exterior spindle for rotating within the door lock assembly for unlatching said door in response to a rotation of an exterior handle, the interior spindle mechanically isolated from the exterior spindle for preventing movement of the exterior spindle caused by an external force on said exterior handle from causing a false generation of said REX signal.

11. The door lock assembly of claim 9, wherein:

said REX switch includes a first REX switch element and a second REX switch element, said first REX switch element for generating said REX signal for said rotation of said interior handle in a first direction, and said second REX switch element for generating said REX signal for said rotation of said interior handle in a second direction.

12. The door lock assembly of claim 9, wherein:

the interior spring package includes a switch actuator plate coupled to said interior handle, said switch actuator plate having a step revolving about a center axis in response to said rotation of said interior handle; and said REX switch generates said REX signal when said step revolves past a position juxtaposed to said REX switch.

13. The door lock assembly of claim 12, wherein:

said switch actuator plate rotates in a plane perpendicular to said center axis in response to said rotation of said interior handle;

said step projects outside said plane; and said REX switch generates said REX signal when said step revolve past said position.

14. The door lock assembly of claim 12, wherein:

said switch actuator plate includes a first said step at an edge of a first tab and a second said step at an edge of a second tab; and said REX switch includes a first REX switch element and a second REX switch element, said first REX switch element using said first step for generating said REX signal in response to said rotation of said interior handle in a first direction, and said second REX switch element using said second step for generating said REX signal in response to said rotation of said interior handle in a second direction.

15. The door lock assembly of claim 12, wherein:

said REX switch generates said REX signal when said rotation rotates an angle in a range of 3 degrees to 8 degrees.

16. The door lock assembly of claim 10, wherein:

the trim piece further includes a switch actuator plate and a spring;

said switch actuator plate having a step revolving about a center axis in response to said rotation of said interior handle;

said REX switch generating said REX signal when said step revolves past a position juxtaposed to said REX switch, wherein the same said step is disposed against said spring for compressing said spring for resisting said rotation.

17. A trim piece, comprising:

a switch actuator plate coupled to an interior handle for rotating in response to a rotation of said interior handle, said interior handle for rotating an interior spindle for unlatching a door, the switch actuator plate having a step, said interior spindle having no rotational connection to the switch actuator plate except through said interior handle, said step revolving about a center axis in response to said rotation; and a request to exit (REX) switch for generating said REX signal when said step revolves past a position juxtaposed to said REX switch.

18. The trim piece of claim 17, wherein:

the REX switch includes a first REX switch element and a second REX switch element, said first REX switch element for generating said REX signal for said rotation in a first direction, and said second REX switch element for generating said REX signal for said rotation in a second direction.

19. The trim piece of claim 17, wherein:

said switch actuator plate rotates in a plane perpendicular to said center axis in response to said rotation;

said step projects outside said plane; and said REX switch generates said REX signal when said tab revolve past said position.

20. The trim piece of claim 17, wherein:

said switch actuator plate includes a first said step at an edge of a first tab and a second said step at an edge of a second tab; and said REX switch includes a first REX switch element and a second REX switch element, said first REX switch element using said first step for generating said REX signal in response to said rotation in a first direction, and said second REX switch element using said second step for generating said REX signal in response to said rotation in a second direction.

21. The trim piece of claim 17, wherein:

said REX switch generates said REX signal when said rotation rotates an angle in a range of 3 degrees to 8 degrees.

22. A method, comprising:

providing a cylindrical door lock assembly for unlocking a door in accordance with a door control signal, said door lock assembly including an interior spindle engaged to an interior handle for rotating about a center axis for unlatching said door in response to a rotation of said interior handle; and an interior trim piece engaged to said interior handle, said interior spindle for passing loosely through an aperture in said trim piece; and installing a request to exit (REX) switch in said interior trim piece for generating a REX signal in response to said rotation.

23. The method of claim 22, wherein:

installing said REX switch includes installing a first REX switch element for generating said REX signal for said rotation in a first direction and installing a second REX switch element using said second actuator of generating said REX signal for said rotation in a second direction.

24. A method, comprising:

providing a cylindrical door lock assembly for unlocking a door in accordance with a door control signal, said door lock assembly including an interior spindle engaged to an interior handle for rotating about a center axis for unlatching said door in response to a rotation of said interior handle; and an interior trim piece engaged to said interior handle, said interior spindle for passing loosely through an aperture in said trim piece, said trim piece including a request to exit (REX) switch; and generating a REX signal from said REX switch in response to said rotation.

25. The method of claim 24, wherein:

generating said REX signal includes generating said REX signal from a first REX switch element of said REX switch for said rotation in a first direction and generating said REX signal from a second REX switch element of said REX switch for said rotation in a second direction.

* * * * *